US009805301B1

(12) United States Patent
Owechko et al.

(10) Patent No.: US 9,805,301 B1
(45) Date of Patent: Oct. 31, 2017

(54) DYNAMIC BACKGROUND ESTIMATION FOR VIDEO ANALYSIS USING EVOLUTIONARY OPTIMIZATION

(75) Inventors: Yuri Owechko, Newbury Park, CA (US); Swarup Medasani, Thousand Oaks, CA (US); Payam Saisan, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 952 days.

(21) Appl. No.: 12/583,519

(22) Filed: Aug. 20, 2009

Related U.S. Application Data

(63) Continuation-in-part of application No. 11/367,755, filed on Mar. 4, 2006, now Pat. No. 7,599,894.

(60) Provisional application No. 60/658,942, filed on Mar. 4, 2005.

(51) Int. Cl.
*G06N 3/00* (2006.01)
*G06K 9/00* (2006.01)

(52) U.S. Cl.
CPC ......... *G06N 3/006* (2013.01); *G06K 9/00335* (2013.01); *G06K 9/00624* (2013.01); *G06K 9/00771* (2013.01)

(58) Field of Classification Search
USPC .......................................................... 706/14
See application file for complete search history.

(56) References Cited

U.S. PATENT DOCUMENTS

| 5,911,035 | A | 6/1999 | Tsao |
| 2003/0142851 | A1 | 7/2003 | Brueckner et al. |
| 2005/0058322 | A1* | 3/2005 | Farmer et al. ................ 382/103 |
| 2006/0023090 | A1* | 2/2006 | Takata et al. ................ 348/239 |

OTHER PUBLICATIONS

Teknomo, Kardi "Performance Index Normalization" Verified by wayback machine to Mar. 2005. [Online] DOwnloaded May 3, 2012. http://web.archive.org/web/20050322062514/http://people.revoledu.com/kardi/tutorial/Similarity/Normalization.html.*

(Continued)

*Primary Examiner* — Ben Rifkin
(74) *Attorney, Agent, or Firm* — Tope-McKay & Associates

(57) ABSTRACT

Described is a system for dynamic background estimation which utilizes Particle Swarm Optimization (PSO). The present invention comprises a system, method, and computer program product for accurate estimation of a background mask corresponding to a dynamically changing scene. The system is configured to construct a background template model of a scene, and then capture an image of a current view of the scene with a camera. Thereafter, the system generates an image-based template matching cost function as an optimization problem, where the objective is to identify and fit a corresponding subregion of the background template model to the current camera view. The cost function is optimized using a PSO search algorithm. Finally, the system is configured to generate the corresponding subregion of the background template model for display. The inherent efficiency of PSO makes this system conducive for use in applications requiring real-time background estimation.

12 Claims, 7 Drawing Sheets

(56) References Cited

OTHER PUBLICATIONS

Viola, Paula and William Wells lil "Alignment by Maximization of Mutual Information" Interntaional Journal of Computer vision 24(2), 1997. [Online] Downloaded May 3, 2012. http://www.springerlink.com/content/j70g72110vu561tj/fulltext.pdf.*

White, Brandyn and Mubarak Shah "Automatically Tuning Bakground Subtraction Parameters Using Particle Swarm Optimziation" 2007 IEEE International Conference on Jul. 5, 2007. [Online] Downloaded May 3, 2012. http://ieeexplore.ieee.org/xpls/abs_all.jsp?arnumber=4285028.*

Moeslund, Thomas. Adrian Hilton and Volker Kruger. "A Survey of advances in vision-based human motion capture and analysis." COmputer Vision and Understanding 104 (2006) [Online] Downloaded Aug. 28, 2012 http://ac.els-cdn.com/S1077314206001263/1-s2.0-S1077314206001263-main.pdf?_tid=2fb89c2c-f120-11e1-b9f8-00000aacb35d&acdnat=1346165815_a4f5404df7405edd.*

Mittal, Anurag and Nikos Paragios "Motion-Based Background Subtraction using Adaptive Kernel Density Estimation" 2004 [Online] Downloaded Aug. 7, 2016 http://ieeexplore.ieee.org/stamp/stamp.jsp?tp=&arnumber=1315179.*

Zhang et al "Fast Image Mosaics Algorithm Using Particle Swarm Optimization" 2006 [Online] Downloaded Jun. 19, 2017 https://link.springer.com/chapter/10.1007/978-1-4020-3953-9_18.*

Tiehan Lv, Burak Ozer and Wayne Wolf, "A Real-Time Background Subtraction Method With Camera Motion Compensation," in Proceedings of International Conference on Multimedia and Expo (ICME), 2004.

C. Ridder, O. Munkelt, and H. Kirchner, "Adaptive background estimation and foreground detection using Kalman-filtering," Proceedings of International Conference on Recent Advances in Mechatronics, ICRAM'95.

C.R. Wren, et al., "Pfinder: Real-time tracking of the human body," In IEEE Transactions on Pattern Analysis and Machine Intelligence, vol. 19, No. 7, pp. 780-785, Jul. 1997.

C. Stauffer and W.E.L. Grimson, "Adaptive background mixture models for real-time tracking," in Proceedings of CVPR'99, pp. 246-252, Jun. 1999.

K. Toyama, et al., "Wallflower: Principles and practices of background maintenance," in Proceeding of IEEE International Conference on Computer Vision, vol. 1, pp. 255-261, 1999.

J. Rittscher, et al., "A probabilistic background model for tracking," in Proceeding of European Conference on Computer Vision, vol. 2, pp. 336-350, 2000.

Y. Hsu, et al., "New likelihood test methods for change detection in image sequences," Computer Vision, Graphics, and Image Processing, vol. 26, pp. 73-106, 1984.

Y-H. Yand and M.D. Levine, "The background primal sketch: An approach for tracking moving objects," Machine Vision Application, vol. 26, pp. 73-106, 1984.

W. Wolf, et al., "Smart cameras as embedded systems," IEEE Computer, 35(9), pp. 48-53, Sep. 2002.

D. Murray and A. Basu, "Motion tracking with an active camera," IEEE Trans. Pattern Analysis and Machine Intelligence, 16(5): 449-459, May 1994.

S. Araki, et al., "Real-time tracking of multiple moving objects contours in a moving camera image sequence," in IEICE Trans. on Information and Systems, Nagoya, Japan, Jul. 2000, vol. E83-D(7), pp. 1583-1591.

E.P. Simoncelli, "Distributed Representation and Analysis of visual motion," PhD thesis, Department of Electrical Engineering and Computer Science, MIT, Cambridge, MA, 1993.

Kennedy, J., Eberhart, R. C., and Shi, Y., Swarm Intelligence San Francisco: Morgan Kaufmann Publishers, 2001, Chapter 7 ("The Particle Swarm"), pp. 287-318.

Eberhart; Yuhui Shi, "Particle swarm optimization: developments, applications and resources," Proceedings of the 2001 Congress on Evolutionary Computation, 2001, vol. 1, pp. 81-86.

Bradski, G. and S. Grossberg (1995), "Fast learning VIEWNET architectures for recognizing 3-D objects from multiple 2-D views," Neural Networks 8, 1053-1080.

Charniak, E. (1991), "Bayesian networks without tears," AI Magazine 12, 50-63.

Medasani, S. and Y. Owechko (2007), "Behavior recognition using cognitive swarms and fuzzy graphs," SPIE Defense and Security Symposium, Orlando, FL.

Notice of Allowance for U.S. Appl. No. 11/367,755, Date mailed: Jun. 2, 2009.

Office Action 1 and References Cited for U.S. Appl. No. 11/367,755, Date mailed: Mar. 21, 2008.

Response to Office Action 1 for U.S. Appl. No. 11/367,755, Date mailed: Jun. 27, 2008.

Office Action 2 for U.S. Appl. No. 11/367,755, Date mailed: Sep. 15, 2008.

Response to Office Action 2 for U.S. Appl. No. 11/367,755, Date mailed: Nov. 17, 2008.

Advisory Action for U.S. Appl. No. 11/367,755, Date mailed: Dec. 11, 2008.

Response to Advisory Action for U.S. Appl. No. 11/367,755, Date mailed: Mar. 16, 2009.

Eberhart, R., et al., "Particle Swami Optimization; Developments, Applications, and Resources," IEEE, 2001, pp. 81-86.

Bhanu, B., et al., "Adaptive Image Segmentation Using a Genetic Algorithm," IEEE Transactions on Systems, Man, and Cybernetics, vol. 25, No. 12, Dec. 1995, pp. 1543-1567.

Doctor, S., et al., "Optimal PSO for Collective Robotic Search Applications," IEEE, 2004, pp. 1390-1395.

Eberhart, R., et al., "Guest Editorial Special Issue on Particle Swarm Optimization," IEEEE Transactions on Evolutionary Computation, vol. 8, No. 3, Jun. 2004, pp. 201-203.

D.L. Swets, et al., "Genetic Algorithms for Object Recognition in a complex scene," Proc. of Intl. Conference on Image Processing, vol. 2, Oct, pp. 23-26, 1995.

V. Ciesielski, et al., "Using genetic algorithms to Improve the accuracy of object detection," In Proceedings of the third Pacific-Asia Knowledge Discovery and Data Mining Conference, Ning Zhong and Lizhu Zhou (Eds.), Knowledge Discovery and Data Mining—Research and Practical Experiences. Tsinghua University Press, pp. 19-24, Beijing, China, Apr. 26-31, 1999.

Kennedy, J., et al., "Swarm intelligence," San Francisco: Morgan Kaufmann Publishers, 2001.

R.C. Eberhart, et al., "Particle swarm optimization: Developments, applications, and resources," 2001.

G. Medioni, I. Cohen, F. Bremond, S. Hongeng, R. Nevatia, "Event detection and analysis from video streams," IEEE PAMI 23(8), 2001, 873-889.

R.T. Collins, A. J. Lipton, and T. Kanade, "Introduction to the special section on video surveillance," IEEE-PAMI, 22(8), Aug. 2000.

N. Oliver, B. Rosario, and A. Pentland, "A Bayesian computer vision system for moceling human interactions," IEEE-PAMI, 22(8), Aug. 2000.

Y. Owechko, S. Medasani, and N. Srinivasa, "Classifier Swarms for Human Detection in infrared imagery," Proc. of the CVPR workshop on Object Tracking and Classification Beyond the Visible Spectrum (OTCBVS'04) 2004.

M.P. Windham, "Numerical classification of proximity data with assignment measure," Journal of Classification, vol. 2, pp. 157-172, 1985.

S. Gold and A. Rangarajan, "A graduated assignment algorithm for graph matching," IEEE Transaction on Pattern Analysis and Machine Intelligence, vol. 18, pp. 377-387, Apr. 1996.

J.C. Bezdek, Pattern Recognition with Fuzzy Objective Function Algorithms, Plenum Press, New York, 1981.

Jean-Yves Bouguet, "Camera Calibration Toolbox for Matlab," http://www.vision.caltech.edu/bouguetj/calib_doc/.

Giorgio Carpaneto, Paolo Toth, "Algorithm 548: Solution of the assignment problem [H]," ACM Transactions on Mathematical Software, 6(1): 104-111, 1980.

I. Hartley, A. Zisserman, "Multiple view geometry in computer vision," Cambridge University Press, Cambridge, UK 2000.

(56) References Cited

OTHER PUBLICATIONS

G. Shakhanarovich, et al. "Integrated face and gait recognition from multiple views," In Proceedings of the IEEE Conference on Computer Vision and Pattern Recognition, Dec. 2001, Kauai, Hawaii.

Y. Owechko, et al., "Vision-Based occupant sensing and recognition for intelligent airbag systems," submitted to IEEE Trans. on Intelligent Transportation Systems, 2003.

Y. Owechko and S. Medasani, "A Swarm-based Volition/Attention Framework for Object Recognition," IEEE Conference on Computer Vision and Pattern Recognition, San Diego, Proc. of CVPR-WAPCV 2005.

P. Saisan, S. Medasani, and Y. Owechko "Multi-View Classifier Swarms for Pedestrian Detection and Tracking," IEEE Conference on Computer Vision and Pattern Recognition, San Diego, 2005.

N. Srinivasa, et al., "Fuzzy edge-symmetry features for enhanced intruder detection," 11th International Conference on Fuzzy Systems, FUZZIEEE 2003.

Jaynes, C., Stolle, F., and Collins, R., "Task Driven Perceptual Organization for Extraction of Rooftop Polygons," Proceedings of the ARPA Image Understanding Workshop, Monterey, California (Morgan Kaufmann Publishers, San Francisco, 1994), pp. 359-365.

A. Ratnaweera, "Self-Organizing hierarchical particle Swarm Optimizer with Time-Varying Acceleration Coefficients," Special issue of IEEE Trans. on Evol. Computation on Particle Swarm Optimization, vol. 8, No. 3, Jun. 2004, pp. 240-255.

C.A. Coello, "Handling Multiple Objectives With Particle Swarm Optimization," Special issue of IEEE Trans. on Evol. Computation on Particle Swarm Optimization, vol. 8, No. 3, Jun. 2004, pp. 256-279.

L. Messerschmidt, et al., "Learning to Play Games Using a PSO-Based Competitive Learning Approach," Special issue of IEEE Trans. on Evol. Computation on Particle Swarm Optimization, vol. 8, No. 3, Jun. 2004, pp. 280-288.

M.P. Wachwiak, et al., "An Approach to Multimodal Biomedical Image Registration Utilizing Particle Swarm Optimization," Special issue of IEEE Trans. on Evol. Computation on Particle Swarm Optimization, vol. 8, No. 3, Jun. 2004, pp. 289-301.

R. Hassan, B. Cohanim, and O. de Weck, "A Comparison of Particle Swarm Optimization and the Genetic Algorithm," AIAA Conference, 2005, pp. 1-13.

J.F. Schutte, J.A. Reinbolt, B.j. Fregly, R.T. Haftka, and A.D. George, "Parallel Global Optimization with the Particle Swarm Algorithm," Int. J. Numerical methods in Engineering, 61: pp. 2296-2315, 2004.

J. Kennedy and W.M. Spears, "Matching Algorithms to Problems: An Experimental Test of the Particle Swarm and Some Genetic Algorithms on the Multimodal Problem Generator," Proceedings of IEEE Inter. Conf. on Evolutionary Computation, pp. 78-83, 1998.

Hu, W., D. Xie, et al. (2004), "Learning activity patterns using fuzzy self-organizing neural network," IEEE Transactions on Systems, Man, and Cybernetics—Part B: Cybernetics 34, pp. 1618-1626.

Lazebnik, S., C. Schmid, et al. (2006), "Beyond bags of features: Spatial pyramid matching for recognizing natural scene categories," IEEE Conference on Computer Vision and Pattern Recognition, New York, NY, pp. 1-8.

Lowe, D. (1999), "Object recognition from local scale-invariant features," International Conference on Computer Vision, Corfu, Greece, pp. 1-8.

S. Medasani, and Y. Owechko, "Possibilistic Particle Swarms for Optimization," Proceedings 5673 of SPIE/IST Symposium on Electronic Imaging, San Jose, 2005, pp. 82-89.

Park, S. and J. Aggarwal "A hierarchical Bayesian network for event recognition of human actions and interactions," Multimedia Systems 10: pp. 164-179 (2004).

Barbara Zitova and Jan Flusser, "Image registration methods: a survey," Image and Vision Computing 21, pp. 977-1000, 2003.

R. Brits, et al., "A Niching Particle Swarm Optimizer," 2002, pp. 1-5.

S. Medasani and R. Krishnapuram, "Graph Matching by Relaxation of fuzzy assignments," IEEE Transactions on Fuzzy Systems, 9(1), pp. 173-183, Feb. 2001.

R. Krishnapuram, S. Medasani, S. Jung and Y. Choi, "Content-Based Image Retrieval Based on a Fuzzy Approach," IEEE Transactions on Knowledge and Data Engineering (TKDE), Oct. 2004, pp. 1185-1199.

N. Oliver and A. Pentland, "Graphical models for driver behavior recognition in a smart car," IEEE Intelligent Vehicles Symposium (2000), pp. 7-12.

K. Sato and J.K. Aggarwal, "Temporal spatio-velocity transform and its application to tracking and interaction," CVIU 96 (2004), pp. 100-128.

S. Hongeng, R. Nevatia, and F. Bremond, "Vide-based event recognition: activity representation and probabilistic recognition methods," CVIU 96(2004), p. 129-162.

N. Oliver, A. Garg, and E. Horvitz, "Layered representations for learning and inferring office activity from multiple sensory channels," CVIU 96(2004), pp. 163-180.

A. Amir, S. Basu, G. Iyengar, C. Lin, M. Naphade, J.R. Smith, S. Srinivasa, and B. Tseng, "A multi-modal system for retrieval of semantic video events," CVIU 96(2004), pp. 216-236.

Z. Zhang, "A flexible new technique for camera calibration," IEEE Transactions on Pattern Analysis and Machine Intelligence, 22(11): pp. 1330-1334, 2000.

OpenCV Computer Vision Library, http://opencv.org/about.html, downloaded on Sep. 12, 2016.

Longuet-Higgins, "A computer algorithm for reconstructing a scene from two projections" Nature, 293: pp. 133-135, Sep. 1981.

T. Kailath, et al., "Linear Estimation," Prentice Hall, NJ, ISBN 0-13-022464-2, 854pp, 2000.

A.R. Dick, et al., "Combining Single view recognition and multiple view stereo for architectural scenes," International Conference on Computer Vision (ICCV'01) vol. 1, Jul. 7-14, 2001, Vancouver, B.C., Canada, pp. 268-274.

Sujit Kuthirummal, et al., "Planar shape recognition across multiple views," In Proceedings of the Interationa Conference on Pattern Recognition (ICPR)—2002, Quebec, Canada, pp. 456-459.

Sujit Kuthirummal, et al., "Multiview constraints for recognition of planar curves in fourier domain," Proceedings of the Indian Conference on Vision Graphics and Image Processing (ICVGIP)—2002, pp. 1-6.

A. Selinger and R.C. Nelson, "Appearance-based object recognition using multiple views," In Proceedings of the IEEE Conference on Computer Vision and Pattern Recognition—Dec. 2001, Kauai, Hawaii, pp. 905-911.

F. Rojas, I. Rojas, R. M. Clemente, and C.G. Puntoner, "Nonlinear blind source separation using genetic algorithms," in Proceedings of International Conference on Independent Component Analysis, 2001, pp. 400-405.

D. Beasley, D. R. Bull, and R. R. Martin, "A Sequential Niching Technique for Multimodal Function Optimization," Evolutionary Computation, 1(2), pp. 101-125, 1993.

R. Krishnapuram and J. M. Keller, "Quantative Analysis of Properties and Spatial Relations of Fuzzy Image Regions," Transactions on Fuzzy Systems, 1(2): pp. 98-110, 1993.

B. Bhanu, et al., "Adaptive Image Segmentation Using a Genetic Algorithm," IEEE Transactions on Systems, Man, and Cybernetics, vol. 25, No. 12, Dec. 1995, pp. 1543-1567.

Y. Owechko and S. Medasani, "Cognitive Swarms for Rapid Detection of Objects and Associations in Visual Imagery," IEEE Swarm Intelligence Symposium, Pasadena, 2005, pp. 1-4.

F. Orabona, G. Metta, and G. Sandini, "Object-based Visual Attention: A Model for a Behaving Robot," in 3rd International Workshop on Attention and Performance in Computational Vision (in CVPR 2005), San Diego, CA, Jun. 2005, pp. 1-8.

B. J. Scholl, "Objects and Attention: The State of the Art," Cognition 80: pp. 1-46, 2001.

Y. Sun and R. Fisher, "Hierarchical Selectivity for Object-based Visual Attention," submitted to Artificial Intelligence, 2004, pp. 1-10.

(56) References Cited

OTHER PUBLICATIONS

Liao, Wenhul and Ji, Qiang 2006, "Efficient Active Fusion for Decision-making via VOI Approximation," in Proc. AAAI 2006, pp. 1180-1185.

A. Huertas, and R. Nevatia, "Detecting Changes in Aerial Views of Man-Made Structures," IVC200, pages—all.

R. Mendes, "The Fully Informed Particle Swarm: Simpler, Maybe Better," Special issue of IEEE Trans. on Evol. Computation on Particle Swarm Optimization, vol. 8, No. 3, Jun. 2004, pp. 204-210.

K.E. Parsopoulos, et al. "On the Computation of All Global Minimizers Through Particle Swarm Optimization," Special issue of IEEE Trans. on Evol. Computation on Particle Swarm Optimization, vol. 8, No. 3, Jun. 2004, pp. 211-224.

F. van der Bergh, et al., "A Cooperative Approach to Particle Swarm Optimization," Special issue of IEEE Trans. on Evol. Computation on Particle Swarm Optimization, vol. 8, No. 3, Jun. 2004, pp. 225-239.

P. Saisan, "Modeling Human Motion for recognition," IS&T/SPIE 17th annual symposium, San Jose, CA 2005, pp. 32-99.

* cited by examiner

DYNAMIC BACKGROUND ESTIMATION FOR VIDEO ANALYSIS USING EVOLUTIONARY OPTIMIZATION

PRIORITY CLAIM

The present application is a Continuation-in-Part Application of U.S. patent Ser. No. 11/367,755, filed Mar. 4, 2006, entitled, "Object Recognition Using a Cognitive Swarm Vision Framework with Attention Mechanisms" which claims the benefit of priority of U.S. Provisional Patent Application No. 60/658,942, filed Mar. 4, 2005, entitled, "Object Recognition Using a Cognitive Swarm Vision Framework with Attention Mechanisms."

BACKGROUND OF THE INVENTION (1) Field of Invention

The present invention relates to a system for background estimation and, more particularly, to a system for background estimation which allows estimation of a stationary background mask of a dynamically changing view utilizing particle swarm optimization.

(2) Description of Related Art

Background estimation mechanisms have application in vision-based reconnaissance and security systems. These types of applications require accurate and fast object (i.e., people, cars, inanimate objects) detection capabilities and, therefore, would benefit greatly from reliable background estimation mechanisms as a way of initial detection and segmentation of foreground objects in a scene. Furthermore, a successful dynamic background estimation mechanism can greatly reduce the computational load of any machine vision-based object and event recognition system.

An increasing number of object tracking algorithms with active cameras have surfaced in recent literature. For instance, in "A Real-Time Tracking of Multiple Moving Object Contours in a Moving Camera Image Sequence" by S. Araki et. al in Transactions on Information and Systems, IEICE 2000, the authors propose algorithms which successfully track interested objects under various conditions. However, the object tracking algorithms fail to identify slow-moving or partially-moving objects, such as a stationary pedestrian waving his hands. These systems would greatly benefit from dynamic background estimation.

Additional prior art in background estimation and the use of background masks has been constrained primarily to stationary cameras, and often, to stationary backgrounds. Most prior art attempts to estimate the changing background by accumulating pixel information from a currently incident background requires accumulation of pixel information over several frames. During this background learning phase, the camera must remain stationary.

A few more sophisticated algorithms have recently surfaced which attempt to address small camera motions. In a recent paper entitled, "A Real-Time Background Subtraction Method with Camera Motion Compensation" by Tiehan Lv et al. in Proceedings of International Conference on Multimedia and Expo (ICME), 2004, the authors propose a background estimation and subtraction algorithm that is designed to work with a "shaking" camera. The method by Lv et al. relies on small incremental camera motion and accurate estimation of camera motion on the fly. Clearly, this and other methods are bound for failure in the case of wide-baseline camera movements.

It is well known in the art that solutions to challenging background estimation problems are fundamental to creation of next generation vision-based classification and tracking systems, particularly in moving camera settings. The present invention described herein is in response to present challenges in background estimation for moving cameras involving wide baseline displacements.

SUMMARY OF THE INVENTION

The present invention relates to a system for background estimation comprising one or more processors configured to perform operations of first capturing an image subregion of a current scene. A cost function is then optimized through utilization of a plurality of particles which operates as a cooperative swarm in sampling the cost function over a search domain of a background template model and iteratively migrates towards an optimal solution. The optimal solution is a subregion of the background template model which corresponds to the image subregion of the current scene. Finally, the subregion of the background template model which corresponds to the image subregion of the current scene is generated.

In another aspect, the cost function to be optimized is $J(x)=d(I(x),I_o)$, with $J:\mathbb{R}^2 \to [0, 1]$, where $I_o \in \mathbb{R}^{w \times h}$ represents the image corresponding to the current scene, $I(x) \in \mathbb{R}^{w \times h}$ represents an image corresponding to a portion of the search domain of the background model template having the same dimensions as $I_o \in \mathbb{R}^{w \times h}$, where x is an input parameter, $d(.)$ represents an image similarity measure, $\mathbb{R}$ denotes the set of real numbers, w is the width of the image, h is the height of the image, $\in$ denotes an element of, and $\to$ represents a function arrow.

In yet another aspect, the image similarity measure is selected from the group consisting of normalized cross correlation, L2 distances, and mutual information.

In another aspect, the image similarity measure varies gradually with respect to at least one misalignment between the background template and the current scene.

In another aspect, in the act of optimizing the cost function, the plurality of particles begin at a randomly initialized state where each particle migrates towards the optimal solution in the search domain according to the following:

$$x_i(t+1)=F(x_i(t),\text{pbest}_i(t),\text{gbest}(t)),$$

where x(t) corresponds to a trajectory of a particle i, pbest represents a particle's current best solution found up to time t, and gbest represents a current global best solution among all particles up to time t.

As can be appreciated by one in the art, the present invention also comprises a method for performing the operations described herein.

As can be appreciated by one in the art, the present invention also comprises a computer program product comprising computer-readable instruction means stored on a computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1B:
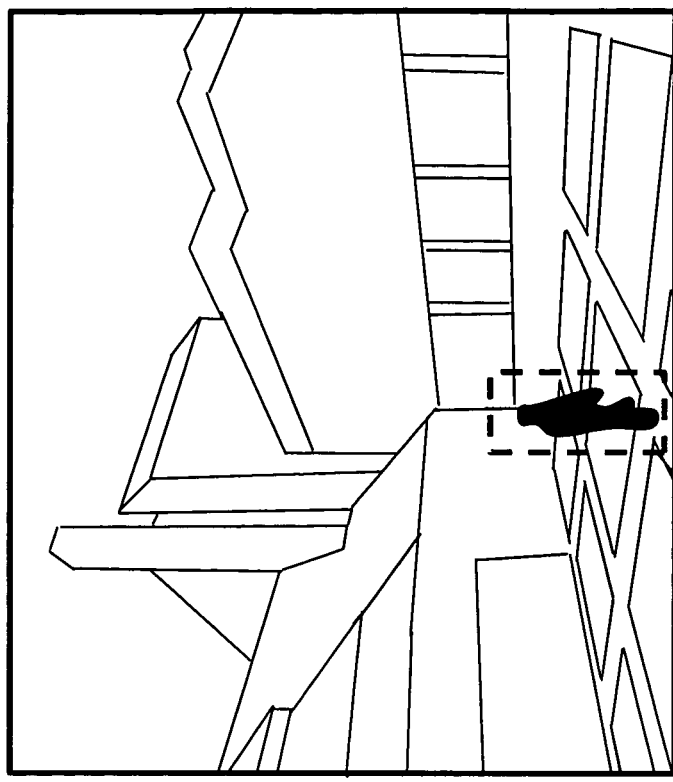
FIG. 1B is an illustration of a current camera view of the scene according to the present invention.

The present invention relates to system for background estimation and, more particularly, to a system for background estimation which allows estimation of a stationary background mask of a dynamically changing view utilizing particle swarm optimization when the background mask is a subregion of a larger background image. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) PRINCIPAL ASPECTS

The present invention has three "principal" aspects. The first is a system for background estimation. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for rapid feature matching for aligning backgrounds in visual systems, typically in the form of software, operated using a data processing system (computer or computer network). The third principal aspect is a computer program product. The computer program product generally represents computer-readable instruction means stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive. These aspects will be described in more detail below.

(2) INTRODUCTION

This present invention provides a background estimation method given an a priori learned background template. Background estimation is one of the fundamental elements of vision-based tracking and recognition systems. Once the stationary background of a region can be identified, it can be subtracted from a dynamic image to yield only the dynamic portion. The dynamic portion will comprise fewer data points and, as such, any analysis of the dynamic portion will execute faster than if the entire view had to be processed. Most existing methods for background subtraction are severely hindered by any type of camera motion. The algorithm presented here is precise, efficient, and capable of coping with wide base camera movements. Furthermore, due to the previously mentioned characteristics, it is suitable for targeting real-time applications. Typically, on the fly background estimation is done by accumulating information on background pixels over a period of video frames while the camera remains stationary. Moving camera paradigms involving large displacements are therefore not suitable for the commonly used background estimation techniques. The present invention provides a solution to the continuous dynamic background estimation problem for moving cameras.

(3) SPECIFIC DETAILS

The present invention relates to a system, method, and computer program product for estimating the stationary background mask of a dynamically changing view captured through a camera that is actively scanning (e.g., pan and tilt) through a wide viewing volume. In the present invention, the camera is moving in azimuth and elevation or pan and tilt. The point of view does not change as the camera is fixed on one location. The background image is also fixed, and a candidate dynamic image covers a section of the background which has an object (e.g., person) in it. The purpose of the present invention is to subtract out the relevant background and focus on the object.

Figure 1A:
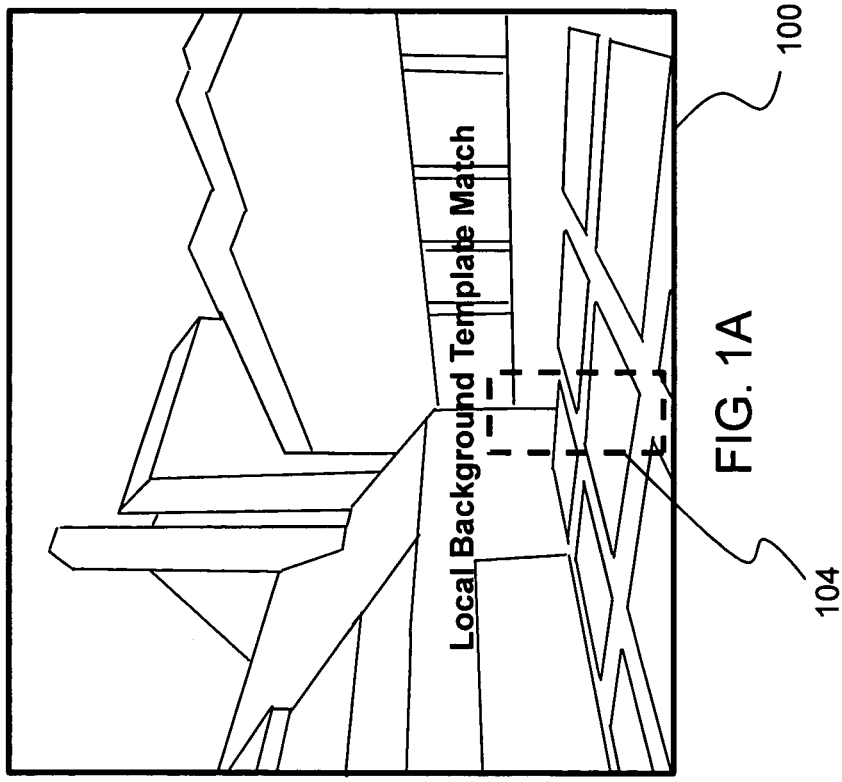
FIG. 1A is an illustration of a background template model of a scene according to the present invention.

As illustrated in FIG. 1A, a large global background template model 100 of a scene is constructed and learned a priori. As a non-limiting example, the approach to building the background template model involves using a Gaussian at each pixel in the scent to represent the background. A snippet of the background-only image is used, and statistics are computed to define the Gaussians for each pixel. This approach for building the background model is further described by Wren et al. in "Pfinder: Real-Time Tracking of the Human Body", IEEE Trans. Pattern Analysis and Machine Intelligence, vol. 19, no. 7, 1997, which is hereby incorporated by reference as though fully included herein. When a camera is incident on a small subregion 102 in the scene, as shown in FIG. 1B, the objective is to identify and accurately fit the corresponding background subregion 104 from the larger background template model 100 to the camera's current view of the subregion 102. While the background (a priori model) is assumed stationary and will remain invariant to geometric and luminance factors, such as viewing angle and lighting conditions, the foreground is expected to change as a result of occluding foreground objects, such as pedestrians. The application of the present invention is aimed for real-time surveillance systems, thus the efficiency and speed of the algorithm is essential. This is achieved through an innovative combination of a template matching cost function in conjunction with an efficient search mechanism based on Particle Swarm Optimization. The combination provides a superior alternative to carrying out a computationally expensive background template matching scheme that would exhaustively search for the current view of the subregion within the global background template model.

Figure 2C:
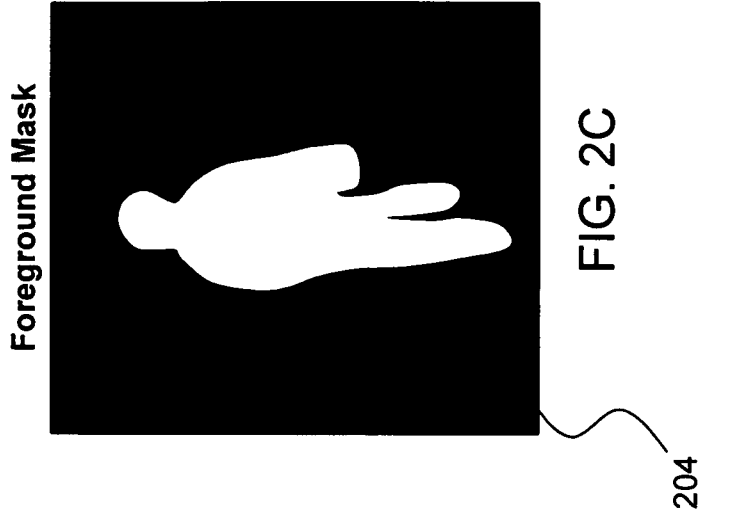
FIG. 2C is an illustration of a foreground mask of the subregion according to the present invention.
Figure 2B:
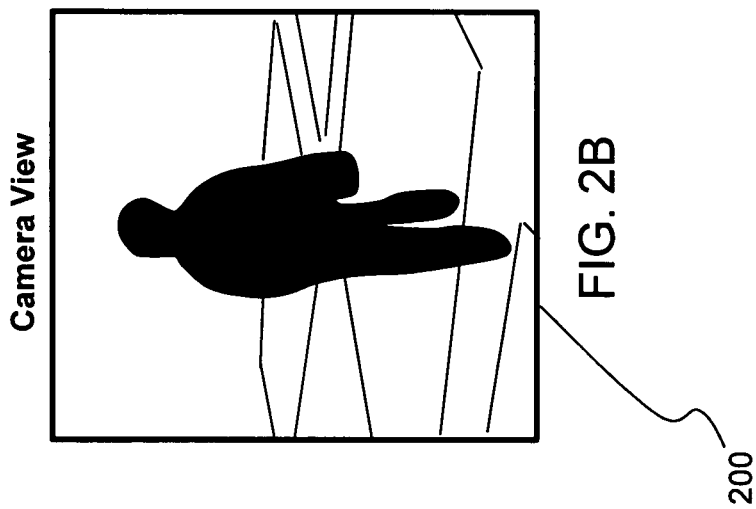
FIG. 2B is an illustration of a current camera view of the subregion according to the present invention.
Figure 2A:
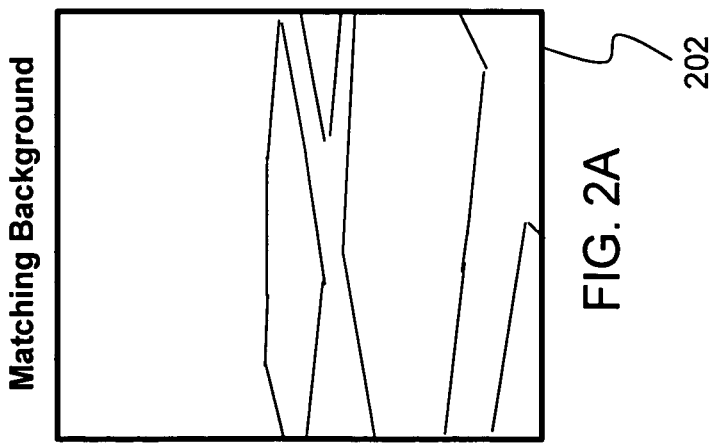
FIG. 2A is an illustration of a subregion of a background template model according to the present invention.

FIG. 2B is an illustration of a current camera view 200. FIG. 2A depicts a matching background patch 202 from the background template model. As shown in FIG. 2C, a foreground mask 204 is extracted by matching the appropriate background mask from the background template model.

(3.1) Template Matching Cost Function

Figure 3:
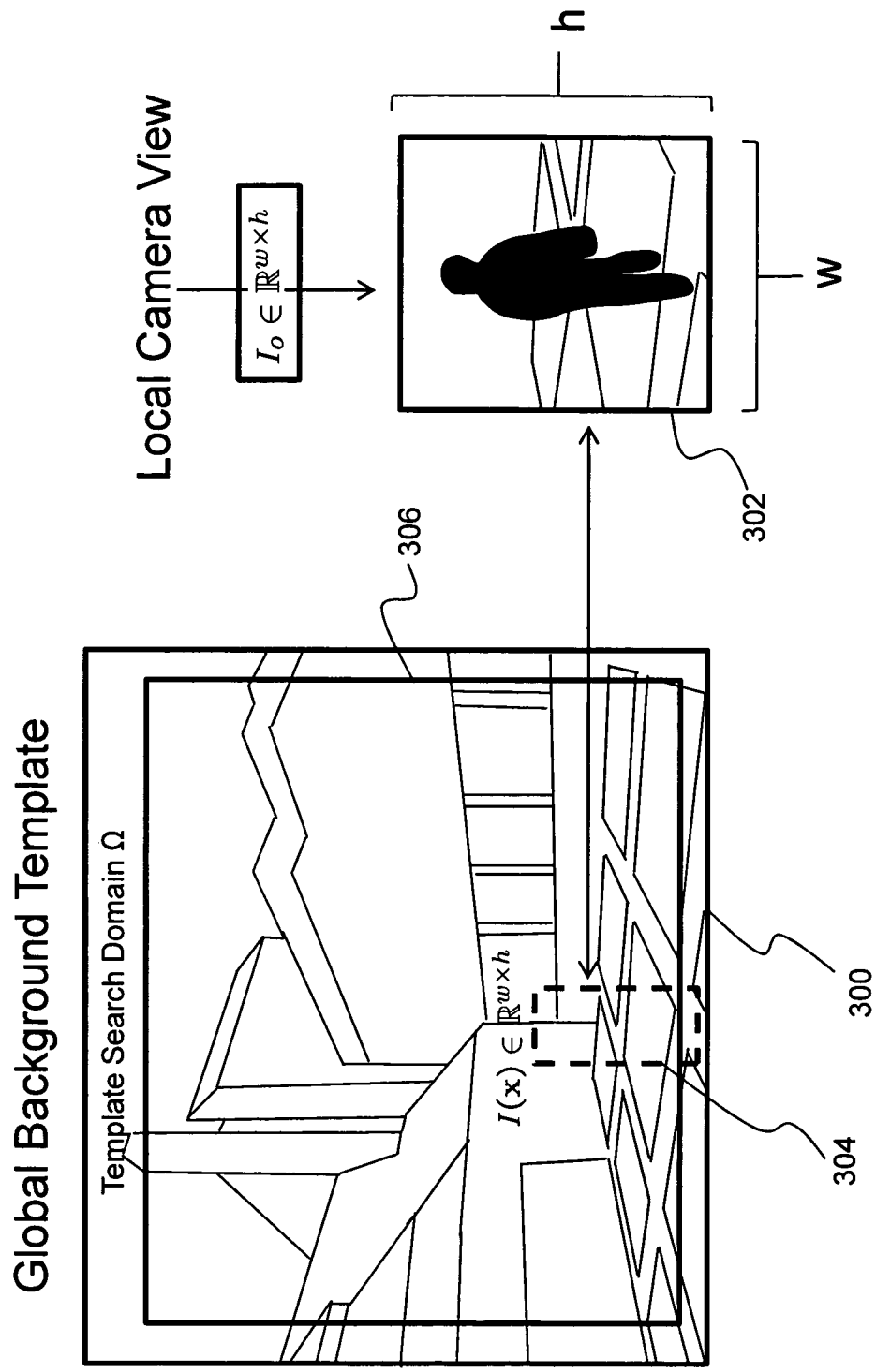
FIG. 3 is an illustration of a background identification according to the present invention.

FIG. 3 illustrates a background identification task posed as a minimization of a template matching cost function that attempts to identify the nominal parameter ($x^*$) for the parameterized patch $I(x)$ in a global background template model 300. A primary element of the invention proposed here is the image-based cost function $d(I(x),I_o)$ that allows casting of the background matching task as an optimization problem. Let $I_o \in \mathbb{R}^{w \times h}$ be the image corresponding to the current camera view 302 and $I(x) \in \mathbb{R}^{w \times h}$ be the image of the same dimensions corresponding to a rectangular patch, or subregion, of the template 304 centered at $x \in \Omega \subset \mathbb{R}^2$. The search domain $\Omega$ 306 is defined such that all possible rectangular windows of size (w by h) can be accommodated.

The background estimation task can be formalized as:

$$x^* = \arg\min d(I(x), I_o)$$

Additionally, the cost function to be optimized is $J(x)=d(I(x),I_o)$, with $J: \mathbb{R}^2 \to [0, 1]$. $J(x)$ takes a parameter x as input and outputs a normalized scalar score corresponding the match between the current camera view and background template patch. The choice of the image similarity measure $d(.)$ is significant, since the optimization paradigm used will involve partly stochastic, sparse sampling of the search space. Therefore, it is highly advantageous for $d(.)$ to exhibit regular continuous variation around the nominal value $x^*$, ideally a Lipschitz continuous function of x. The optimal choice of the image similarity measure depends ultimately on the nature of the images. For most scenes, one might opt for simple L2 type distances or normalized cross correlation. L2 type distances are the sum of the squares of the difference in intensities between two aligned or registered images. An equivalent notation for L2 type distances is $\|I(x)-I_o\|^2$. What is needed is a matching function that varies gradually with respect to small misalignments between the template and the current camera view but one that, at the same time, allows for precision alignment of the background template. It has been shown in the literature that entropic similarity measures (or mutual information measures) between images have desirable properties for precision template registration. Pixel intensity probability distributions used to compute mutual information do not vary irregularly with small geometric misalignments or local lighting changes between images which makes mutual information the preferred choice for the task.

Figure 4:
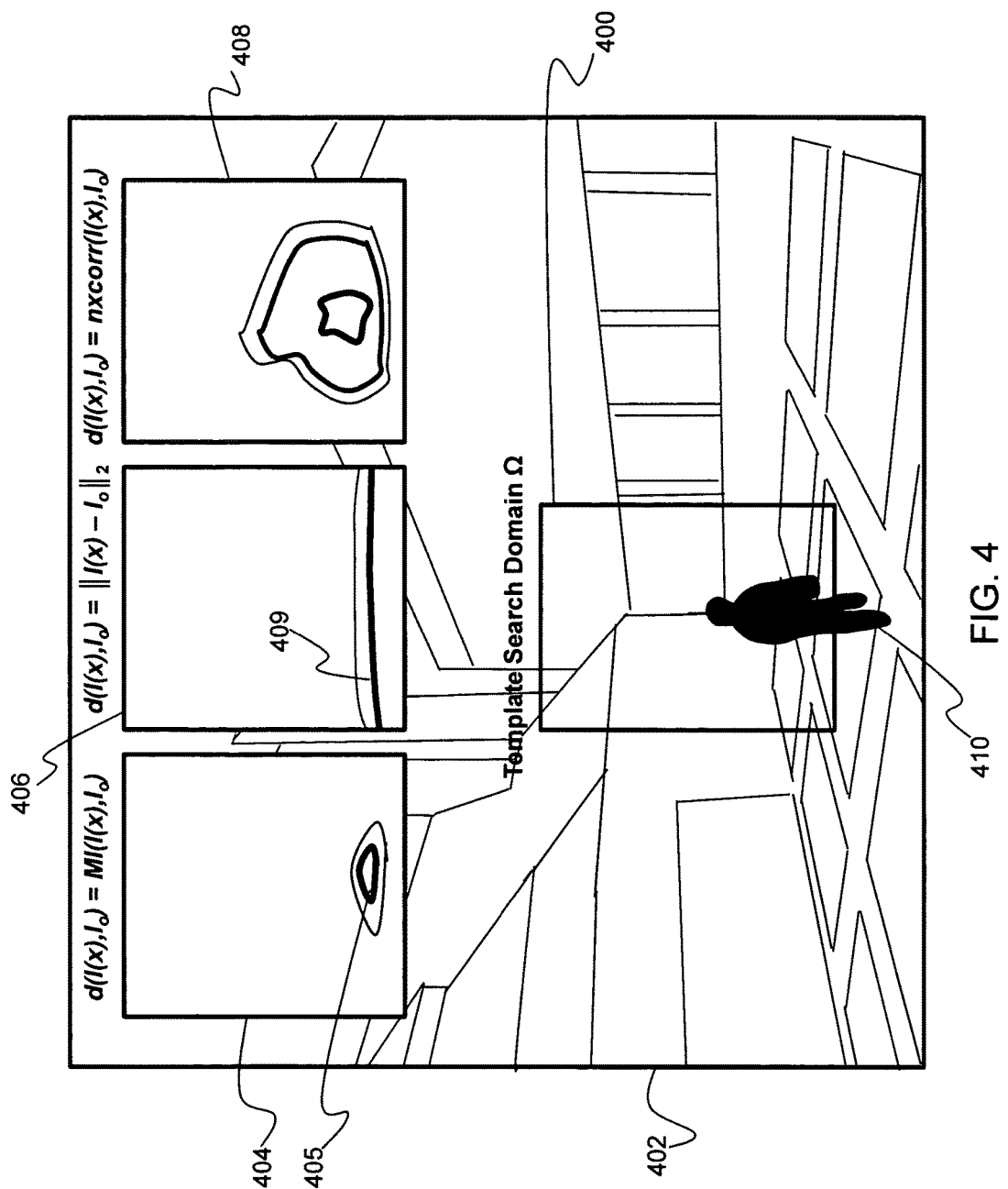
FIG. 4 depicts an illustration of intensity plots of image similarity measures over a search domain according to the present invention.

FIG. 4 depicts illustrations of intensity plots of three different image similarity measures, $J(x)=d(I(x),I_o)$, over the limited search domain $\Omega$ 400 of the background template model 402 using several different image similarity measures. The intensity plots illustrate contours of constant intensity in the images, with the enclosed regions being most intense. The image similarity measures used include mutual information 404, L2 distances 406, and normalized cross correlation 408. As predicted by analysis, mutual information 404 exhibits the sharpest peak 405 (the smallest area within a given contour of constant intensity) around the target, in this case a pedestrian 410. While normalized cross correlation 408 exhibits a smoother variation 409 over a wider area around the neighborhood of the target 410, the precision peak 405 for the mutual information 404 is clearly more pronounced.

Mutual information between two random variables $I(X; Y)$ is defined as follows:

$$I(X;Y) = \int_Y \int_X p(x,y) \log\left(\frac{p_{XY}(x,y)}{p_X(x)p_Y(y)}\right) dx dy.$$

In the present application, X represents a first distribution (e.g., background image), and Y represents a second distribution (e.g., candidate image). x and y represent the intensities of the background image and the candidate image, respectively. $p_X$ represents the distribution of pixel intensities of image X, and $p_Y$ represents the distribution of pixel intensities. $p_{XY}$ denotes the joint distribution of the two images X and Y (i.e., the distribution of intensities for the overlap of the two images). Given a camera, the direction of the camera is known such that for any image obtained, the Cartesian coordinates of any point in the image can be determined. In the present invention, since the same camera is to be used for both the background image and the candidate dynamic image, the two images can be registered, or aligned. Therefore, upon overlay or registering of the two images, a pair of intensities can be obtained for each pixel. The joint distribution described above is a histogram of the pairs of intensities.

With mutual information as the image similarity measure $d(.)$, the second primary element of the algorithm is the search algorithm for finding the target x. The present system utilizes Particle Swarm Optimization (PSO) as its search algorithm. In PSO, a set of n active particles sample the cost function over the search space sparsely, and iteratively move towards the optimal point x*. Starting at randomly initialized state $x_i(t=0)x_{i_o}$, every point i in the set migrates towards the minima in the parameter search space according to the PSO dynamics:

$$x_i(t+1)=F(x_i(t),pbest_i(t),gbest(t)).$$

In this case, pbest(t) corresponds to a particle's best (optimal value) in its trajectory so far, and gbest represents a global optimal value for all particles up to time t. $F(.)$ represents the particle's dynamic evolution (e.g., its next position in the search or solution space) as a function of its current position or state, the best local value pbest and the best global value gbest. The form of $F(.)$ is described in the next section.

(3.2) Particle Swarm Optimization

Particle Swarm Optimization (PSO) is an optimization method that has its roots in artificial life, specifically bird flocking and swarming theory. PSO is a simple but powerful population-based algorithm that is effective for optimization of a wide range of functions as described by Kennedy et al. in "Swarm Intelligence", San Francisco: Morgan Kaufmann Publishers, 2001, and by Eberhart and Shi in "Particle Swarm Optimization: Developments, Applications, and Resources", 2001, which is hereby incorporated by reference as though fully included herein. The basic idea is relatively simple, minimize (or maximize) a cost function $f(x)$ with $f: \in \mathbb{R}^n \to \mathbb{R}$, using a swarm of dynamic particles that cooperatively search the parameter solution space, $x \in \Omega \subset \mathbb{R}^n$, searching for the minima. Each particle evaluates the cost function along its trajectory $x(t)$, while keeping track of the best solution it has found so far (pbest), where $f(x)$ is minimized along $x(t)$. The current best (optimal) solution among all the points is also tracked using a global best parameter (gbest). At any given time t, the velocity of particle i, $v(t)$, is then updated to point towards pbest and gbest, up to a random factor defined by system parameters. The particle dynamics is described by the following state evolution equations:

$$v_i(t+1)=wv_i(t)+c_1q(pbest-x_i(t))+c_2q(gbest-x_i(t))$$

$$x_i(t+1)=x_i(t)+v_i(t+1).$$

This is essentially a discrete time dynamical system. Here $x_i(t)$ and $v_i(t)$ are the position and velocity vectors. At time t of the i-th particle, $q \sim [0,1]$ is a uniformly distributed random variable, and $c_1$ and $c_2$ are parameters that weigh the influence of their respective terms in the velocity update equation. w is a decay constant which controls the swarm's asymptotic (convergence) behavior. The parameter q facilitates an initially random search of the solution space. The search becomes more directed after a few iterations, depending on $f(x)$ and system parameters, as the swarm is attracted towards "favorable" regions.

PSO operates on the assumption that in most practical problems, good solutions usually have better than average solutions residing in a volume around the best solution. These "halo" solutions tend to attract the swarm and concentrate it on regions that are likely to contain good solutions, which make PSO search very efficient. PSO is similar to other evolutionary methods in that it does not use gradient information and can be used with ill-behaved cost functions. Furthermore, it has been found, through empirical simulations, that the number of particles and iterations required scale weakly with the dimensionality of the solution space.

Figure 5:
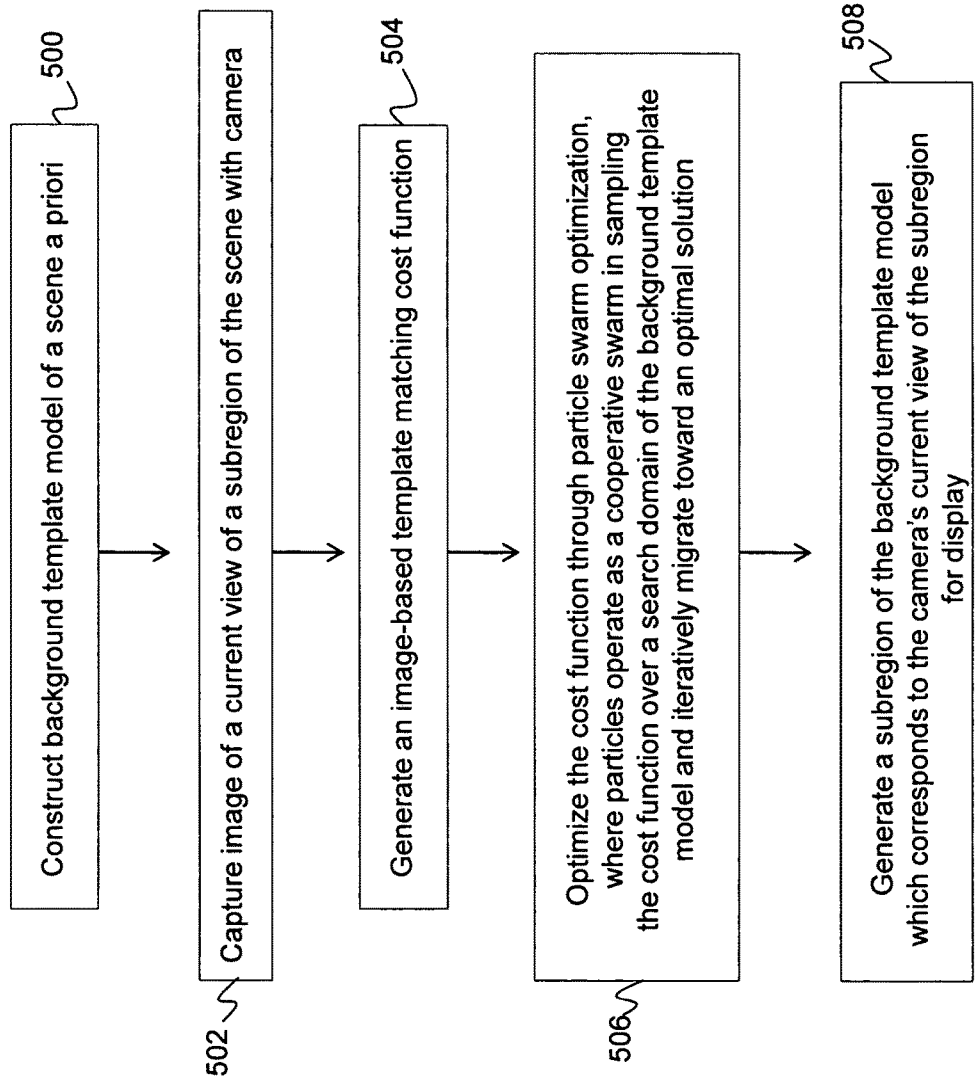
FIG. 5 illustrates a system for background estimation according to the present invention.

FIG. 5 illustrates the system for background estimation according to the present invention. First, a background template model of a scene is constructed a priori 500. Thereafter, an image of a current view of a subregion of the scene is captured with a camera 502. Next, an image-based template matching cost function is generated 504, and the cost function is optimized through PSO. In PSO, the particles operate as a cooperative swarm in sampling the cost function over a search domain of the background template model and iteratively migrate toward an optimal solution 506. Finally, a subregion of the background template model which corresponds to the camera's current view of the subregion is generated for display to a user 508.

Figure 6:
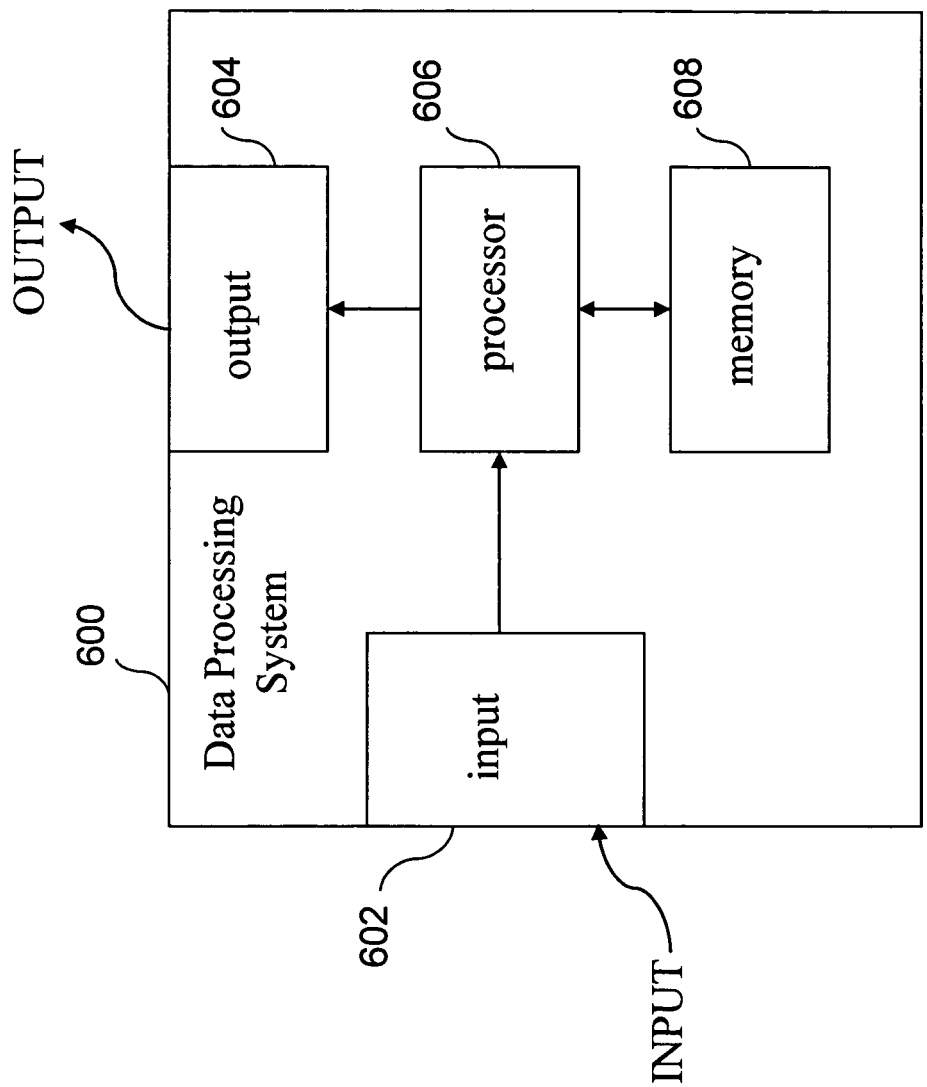
FIG. 6 is an illustration of a data processing system according to the present invention.

FIG. 6 illustrates a block diagram depicting components of a data processing system 600 (e.g., computer) incorporating the operations of the method described above. The method utilizes a data processing system 600 for storing computer executable instructions for causing a processor to carry out the operations of the above described method. The data processing system 600 comprises an input 602 for receiving information from a user. Information received may include input from devices such as cameras, scanners, keypads, keyboards, microphone, other peripherals such as storage devices, other programs, etc. The input 602 may include multiple "ports." An output 604 is connected with a processor 606 for providing information for transmission to other data processing systems, to storage devices, to display devices such as monitors, to generating information necessary for delivery, and to other mechanisms for presentation in user-usable forms. The input 602 and the output 604 are both coupled with the processor 606, which may be a general-purpose computer processor or a specialized processor designed specifically for use with the present invention. The processor 606 is coupled with a memory 608 to permit storage of data and software to be manipulated by commands to the processor 606.

Figure 7:
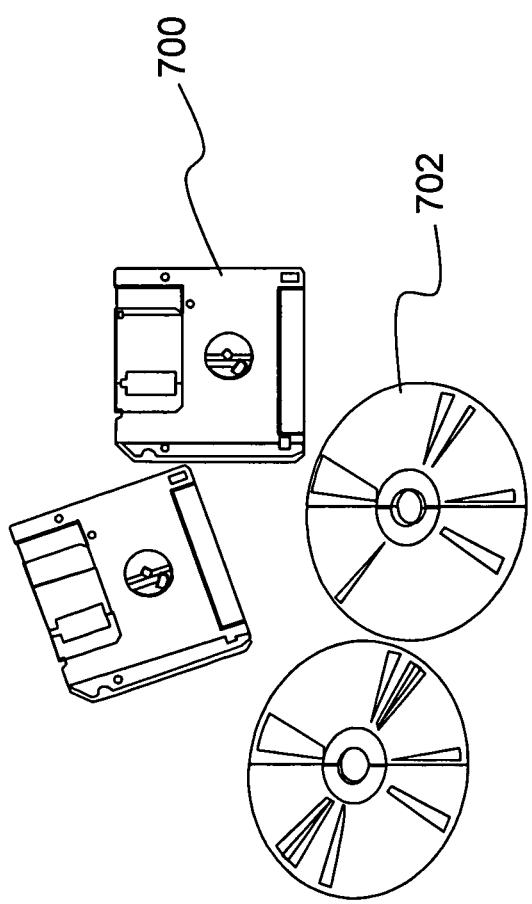
FIG. 7 is an illustration of a computer program product according to the present invention.

An illustrative diagram of a computer program product embodying the present invention is depicted in FIG. 7. As a non-limiting example, the computer program product is depicted as either a floppy disk 700 or an optical disk 702. However, as mentioned previously, the computer program product generally represents computer readable code stored on any compatible computer readable medium.

(4) CONCLUSION

In the present invention, a system, method, and computer program product is devised for accurate estimation of a background mask corresponding to a dynamically changing scene by efficiently searching through an a priori learned global background model using entropic similarity measures. The inherent efficiency of PSO makes this system conducive for use in applications requiring real-time background estimation. This present invention comprises an innovative combination of primary elements which include an image-based template matching cost function and a PSO framework. The image-based template matching cost function varies continuously around the neighborhood of a target. Furthermore, the PSO framework is conducive for finding extremes of non-convex functions without the need for computation of gradients or exhaustive or dense sampling of the cost function within the objective function's search domain. The continuous variation of the cost function is a necessary element for the PSO which functions by stochastic sparse sampling of the objective function.

What is claimed is:

1. A system for background estimation, the system comprising one or more processors that are configured to perform operations of:
    constructing and learning a background template model of a field-of view of a scene captured with a camera a priori;
    capturing a current image of the scene with the camera, the current image of the scene having a dynamically changing field-of-view of the scene that is smaller than the field-of-view of the background template model;
    minimizing a template matching cost function to identify a parameter x* for a parameterized patch of the background template model which corresponds to the camera's current field-of-view, wherein the template matching cost function takes a parameter x as input and outputs a normalized scalar score corresponding to a match between the camera's current field-of-view and the parameterized patch of the background template model using an image similarity measure selected from the group consisting of normalized cross correlation and L2 distances,
    wherein the template matching cost function is minimized through utilization of a plurality of particles which operates as a cooperative swarm in sampling the cost function over a search domain of the background template model and iteratively migrates towards the parameter x*;
    for each current field-of-view, continuously matching the camera's current field-of-view with the parameterized patch of the background template model;
    subtracting the parameterized patch of the background template model from the camera's current field-of-view to extract a foreground mask; and
    generating a display of the foreground mask for detecting at least one object of interest within the foreground mask.

2. A system for background estimation as set forth in claim 1, wherein the cost function to be optimized is $J(x)=d(I(x),I_o)$, with $J:\mathbb{R}^2 \rightarrow [0, 1]$,
    where $I_o \in \mathbb{R}^{w \times h}$ represents the image corresponding to the current scene, $I(x) \in \mathbb{R}^{w \times h}$ represents an image corresponding to the parameterized patch of the background template model centered at $x \in \Omega \subset \mathbb{R}^2$ having the same dimensions as $I_o \in \mathbb{R}^{w \times h}$, where x is an input parameter, d(.) represents an image similarity measure, R denotes the set of real numbers, w is the width of the image, h is the height of the image, $\in$ denotes an element of, $\Omega$ represents the search domain, and $\rightarrow$ represents a function arrow.

3. A system for background estimation as set forth in claim 2, wherein the image similarity measure varies with respect to at least one misalignment between the background template and the current scene.

4. A system for background estimation as set forth in claim 3, wherein in the act of optimizing the cost function, the plurality of particles begin at a randomly initialized state, where each particle migrates towards the optimal solution in the search domain according to the following:

$$x_i(t+1)=F(x_i(t),pbest_i(t),gbest(t)),$$

where x(t) corresponds to a particle i's trajectory, pbest represents a particle's current best solution found up to time t, gbest represents a current global best solution among all particles up to time t, and F(.) represents a particle's dynamic evolution as a function of its current position or state, pbest, and gbest.

5. A computer-implemented method for background estimation, the method comprising an act of causing a processor to perform operations of:
    constructing and learning a background template model of a field-of view of a scene captured with a camera a priori;
    constructing and learning a background template model of a field-of view of a scene captured with a camera a priori;
    capturing a current image of the scene with the camera, the current image of the scene having a dynamically changing field-of-view of the scene that is smaller than the field-of-view of the background template model;
    minimizing a template matching cost function to identify a parameter x* for a parameterized patch of the background template model which corresponds to the camera's current field-of-view, wherein the template matching cost function takes a parameter x as input and outputs a normalized scalar score corresponding to a match between the camera's current field-of-view and the parameterized patch of the background template model using an image similarity measure selected from the group consisting of normalized cross correlation and L2 distances,
    wherein the template matching cost function is minimized through utilization of a plurality of particles which operates as a cooperative swarm in sampling the cost function over a search domain of the background template model and iteratively migrates towards the parameter x*;
    for each current field-of-view, continuously matching the camera's current field-of-view with the parameterized patch of the background template model;
    subtracting the parameterized patch of the background template model from the camera's current field-of-view to extract a foreground mask; and
    generating a display of the foreground mask for detecting at least one object of interest within the foreground mask.

6. A method for background estimation as set forth in claim 5, wherein the cost function to be optimized is $J(x)=d(I(x),I_o)$, with $J:\mathbb{R}^2 \rightarrow [0, 1]$,
    where $I_o \in \mathbb{R}^{w \times h}$ represents the image corresponding to the current scene, $I(x) \in \mathbb{R}^{w \times h}$ represents an image corresponding to the parameterized patch of the background template model centered at $x \in \Omega \subset \mathbb{R}^2$ having the same dimensions as $I_o \in \mathbb{R}^{w \times h}$, where x is an input parameter, d(.) represents an image similarity measure, R denotes the set of real numbers, w is the width of the image, h is the height of the image, $\in$ denotes an element of, $\Omega$ represents the search domain, and $\rightarrow$ represents a function arrow.

7. A method for background estimation as set forth in claim 6, wherein the image similarity measure varies with respect to at least one misalignment between the background template and the current scene.

8. A method for background estimation as set forth in claim 7, wherein in the act of optimizing the cost function, the plurality of particles begin at a randomly initialized state, where each particle migrates towards the optimal solution in the search domain according to the following:

$$x_i(t+1)=F(x_i(t),pbest_i(t),gbest(t)),$$

where x(t) corresponds to a particle i's trajectory, pbest represents a particle's current best solution found up to time t, gbest represents a current global best solution among all particles up to time t, and F(.) represents a particle's dynamic evolution as a function of its current position or state, pbest, and gbest.

9. A computer program product for background estimation, the computer program product comprising computer-readable instruction means stored on a non-transitory computer-readable medium that are executable by a computer having a processor for causing the processor to perform operations of:

constructing and learning a background template model of a field-of view of a scene captured with a camera a priori;

capturing a current image of the scene with the camera, the current image of the scene having a dynamically changing field-of-view of the scene that is smaller than the field-of-view of the background template model;

minimizing a template matching cost function to identify a parameter x* for a parameterized patch of the background template model which corresponds to the camera's current field-of-view, wherein the template matching cost function takes a parameter x as input and outputs a normalized scalar score corresponding to a match between the camera's current field-of-view and the parameterized patch of the background template model using an image similarity measure selected from the group consisting of normalized cross correlation and L2 distances, wherein the template matching cost function is minimized through utilization of a plurality of particles which operates as a cooperative swarm in sampling the cost function over a search domain of the background template model and iteratively migrates towards the parameter x*;

for each current field-of-view, continuously matching the camera's current field-of-view with the parameterized patch of the background template model;

subtracting the parameterized patch of the background template model from the camera's current field-of-view to extract a foreground mask; and generating a display of the foreground mask for detecting at least one object of interest within the foreground mask.

10. A computer program product for background estimation as set forth in claim 9, wherein the cost function to be optimized is $J(x)=d(I(x),Io)$, with $J:\mathbb{R}^2 \to [0, 1]$, where $I_o \in \mathbb{R}^{w \times h}$ represents the image corresponding to the current scene, $I(x) \in \mathbb{R}^{w \times h}$ represents an image corresponding to the parameterized patch of the background template model centered at $x \in \Omega \subset R^2$ having the same dimensions as $I_o \in \mathbb{R}^{w \times h}$, where x is an input parameter, d(.) represents an image similarity measure, R denotes the set of real numbers, w is the width of the image, h is the height of the image, $\in$ denotes an element of, $\Omega$ represents the search domain, and $\to$ represents a function arrow.

11. A computer program product for background estimation as set forth in claim 10, wherein the image similarity measure varies with respect to at least one misalignment between the background template and the current scene.

12. A computer program product for background estimation as set forth in claim 11, wherein in the act of optimizing the cost function, the plurality of particles begin at a randomly initialized state, where each particle migrates towards the optimal solution in the search domain according to the following:

$$x_i(t+1)=F(x_i(t),pbest_i(t),gbest(t)),$$

where x(t) corresponds to a particle i's trajectory, pbest represents a particle's current best solution found up to time t, gbest represents a current global best solution among all particles up to time t, and F(.) represents a particle's dynamic evolution as a function of its current position or state, pbest, and gbest.

* * * * *